United States Patent
Enomoto et al.

(10) Patent No.: US 7,446,441 B2
(45) Date of Patent: Nov. 4, 2008

(54) OUTER ROTOR TYPE HYBRID STEPPING MOTOR

(75) Inventors: Yuji Enomoto, Hitachi (JP); Kenji Miyata, Hitachi (JP); Yasuaki Motegi, Kiryu (JP); Shoji Ohiwa, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 27 days.

(21) Appl. No.: 10/921,115

(22) Filed: Aug. 19, 2004

(65) Prior Publication Data

US 2005/0067903 A1   Mar. 31, 2005

(30) Foreign Application Priority Data

Sep. 25, 2003   (JP) .............................. 2003-332700

(51) Int. Cl.
*H02K 37/06* (2006.01)
(52) U.S. Cl. ................................... 310/49 R
(58) Field of Classification Search ............... 310/49 R
See application file for complete search history.

(56) References Cited

U.S. PATENT DOCUMENTS

| | | | | |
|---|---|---|---|---|
| 4,994,702 A | * | 2/1991 | Arita | 310/254 |
| 5,552,653 A | * | 9/1996 | Nose | 310/263 |
| 6,034,450 A | * | 3/2000 | Kojima et al. | 310/49 R |
| 6,441,522 B1 | * | 8/2002 | Scott | 310/156.23 |
| 2003/0102727 A1 | * | 6/2003 | Sakamoto | 310/49 R |

FOREIGN PATENT DOCUMENTS

JP   2003-070222   3/2003

OTHER PUBLICATIONS

Practical Motor Design Manual (1992); Author: Toshiba, Small Motor Study Group; Publisher: Sogo Electronic Research Co.

* cited by examiner

*Primary Examiner*—Burton Mullins
(74) *Attorney, Agent, or Firm*—Crowell & Moring LLP

(57) ABSTRACT

An outer rotor type hybrid stepping motor including a stator, a rotor, a magnet disposed axially in either the stator or rotor, a stator core disposed inward from a gap formed between the stator and rotor, the rotor disposed outside the gap, and a stator winding wound around the stator core. The outer rotor type hybrid stepping motor has a cross-sectional area A in the axial direction of the magnet, a gap portion diameter D, a lamination thickness of the stator core in the axial direction L and a residual magnetic flux density of the magnet Br. The lamination thickness of the stator core in the axial direction L and the residual magnetic flux density Br are determined according to the equation $D \times L/A = k \times Br$ with the condition that coefficient k is kept in a range of 0.56-0.66(1/T). The resulting optimized design parameters for L and Br provide a reduction in size of the outer rotor type hybrid stepping motor, a high output and a high resolution.

2 Claims, 4 Drawing Sheets

MAGNET RESIDUAL MAGNETIC FLUX DENSITY Br(T)

D : GAP PORTION DIAMETER
L : AXIAL DIRECTION LAMINATIO THICKNESS
A : MAGNET EFFCTIVE SURFACE AREA

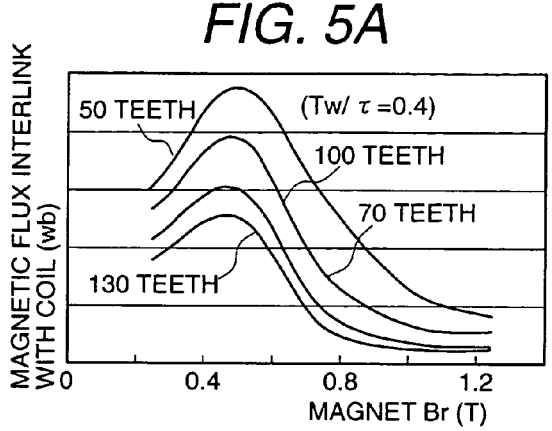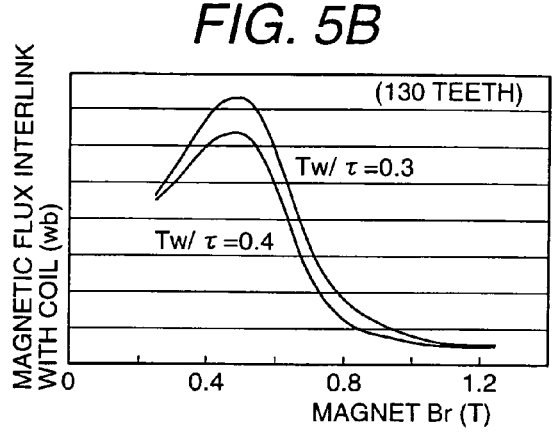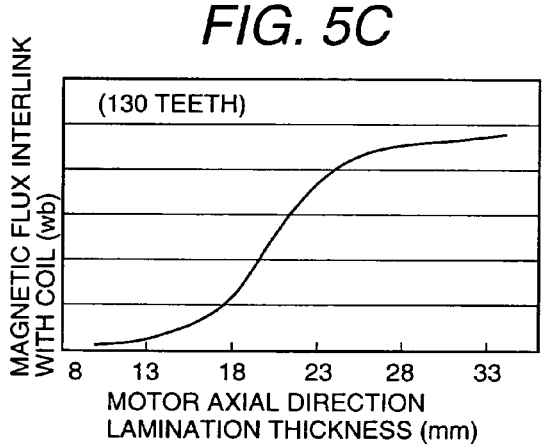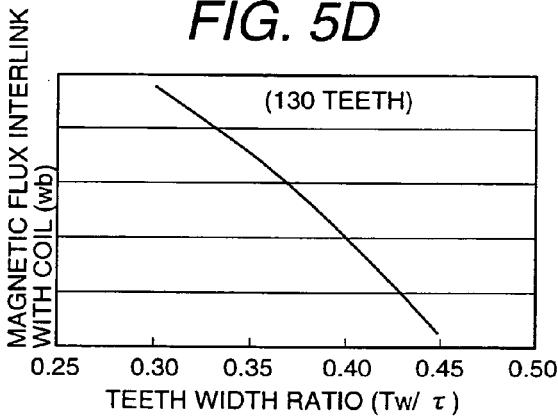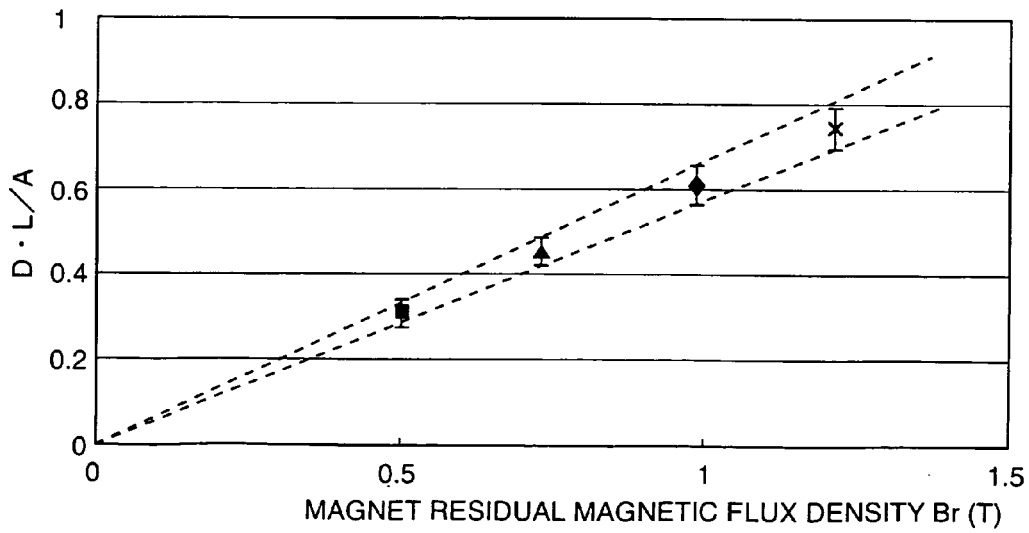

OUTER ROTOR TYPE HYBRID STEPPING MOTOR

BACKGROUND OF THE INVENTION

1. Field of the Invention

The present invention relates to an outer rotor type hybrid stepping motor, which is used, for example, for driving office automation machine and apparatus and for positioning factory automation use facilities.

2. Conventional Art

A stepping motor is usually used as a driving use motor and is generally used, in particular, for precise positioning use. Specifically, a hybrid type (herein below frequently abbreviated as HB type) stepping motor, which utilizes both magnet and reluctance torque, is used for the purpose of highly accurate positioning. For example, JP-A-2003-70222 discloses an HB type stepping motor.

In order to perform a highly accurate positioning with an HB type stepping motor, it is necessary to reduce a base step angle which represents a unit rotation angle when a unit pulse is input and in order to reduce the base step angle, it is necessary to increase number of teeth (number of poles) in the circumferential direction. On the other hand, there is a demand to reduce the size of the stepping motor. However, when the size of the motor is reduce, the diameter thereof has to be reduced, which prevents the number of teeth from increasing because of processing limitation, therefore, the above necessity and demand are in a trade off relationship.

When designing an HB type stepping motor, number of teeth Nr of a rotor, magneto motive force Um of a magnet, number of turns AC of a winding, gap average magnetic flux density Bg, axial direction lamination thickness L and permeance ratio P1/P2 are determined by making use of the following formula (1) in a manner to increase the torque Tq under a determined physical scale and within the range of the material properties to be used;

$$Tq \propto Nr \times Um \times AC \times Bg \times L \times P1/P2 \qquad (1)$$

However, since the permeance ratio P1/P2 increases, when increasing the number of teeth Nr, and further, the number of turns AC is substantially determined by the physical scale of the motor, if the magneto motive force Um is required to increase, the cost of the motor increases. For this reason, the usable range of the parameters was generally limited for the motor design.

Further, Author: Toshiba, Small Motor Study Group "Practical Motor Design Manual" (Publisher: Sogo Electronic Research Co., Published Dec. 25, 1992) discloses that a teeth width ratio in a range of 0.3-0.45 determined by tooth width Tw and teeth pitch τ is to be used and the permeance ratio P1/P2 can be determined by estimating the maximum permeance and the minimum permeance of the gap with reference to the value of the teeth width ratio, the teeth pitch τ and the gap width δ g. According to the disclosed method, the smaller the number of teeth is, the larger the permeance ratio P1/P2 can be achieved at the teeth width ratio of about 0.35.

The above conventional art can be used as one of design guidelines for HB type stepping motors, through which a motor having a certain level of performance can be designed. However, when such as an extreme increase of pole number and size reduction of a motor is required, a limited solution can be obtained within the design guideline. Further, an evaluation of an experimental model according to the guideline is difficult, because the gap width of this type of motor is extremely small less than 50 μm and the magnetic characteristics of the materials used vary significantly depending on production means, therefore, there was a problem which prevents a parameter survey to determine optimum design values.

SUMMARY OF THE INVENTION

An object of the present invention is to provide an outer rotor type hybrid stepping motor which uses new indexes for optimum design parameters of the motor and which realizes size reduction, a high output and a high resolution.

In order to achieve the above object, in the present invention, an outer rotor type hybrid stepping motor is employed in which a stator winding is disposed in an inner circumferential side of a gap and a rotor is disposed in the outer side of the gap so as to reduce the diameter of an HB type stepping motor, and when selecting a gap width of the gap as being about 30-60 μm, which represents a quality control limit with regard to processing and assembling the motor, residual magnetic flux density of a magnet and axial direction lamination thickness of a motor core which will generate a maximum torque can be determined by making use of a relation of a teeth width ratio representing a relation between small tooth width and the pitch thereof and gap magnetic flux density. More specifically, when assuming that the teeth pitch is τ and the tooth width is Tw (toothwidth ratio is Tw/τ) and in case of Tw/τ=0.3, the maximum torque can be obtained when a gap average magnetic flux density Bg is 1.6-1.8 T, which is determined by dividing a total magnetic flux amount calculated from residual magnetic flux density Br of the magnet and surface area A of the magnet with small teeth surface area At of the rotor. Since the small teeth surface area At can be expressed by a product of the small tooth width Tw, number of small teeth Nr and the lamination thickness L, an optimum lamination thickness can be determined with only one solution. Further, in case of different teeth width ratios, the following gap magnetic flux densities assume optimum values, in that when Tw/τ=0.35, 1.4-1.5 T, when Tw/τ=0.4, 1.2-1.4 T, when Tw/τ=0.45, 1.0-1.2 T are set.

When explaining the above in other words, when assuming gap average magnetic flux density as Bg, magnet axial direction surface area as A, gap portion diameter as D and lamination thickness as L. the lamination thickness L and magnet residual magnetic flux density Br are determined so that the coefficient k in the following equation (2) takes a value in a range of 0.56-0.66(1/T).

$$D \times L/A = k \times Br[k = 1/(\pi \times Bg \times Tw/\tau)] \qquad (2)$$

In the present invention, after calculation of magnetic flux density, interlinking magnetic flux density, induced voltage and torque by making use of three dimensional magnetic field analysis of an HB type stepping motor of which experimental model evaluation is difficult, optimum values are deduced from survey result of parameters for realizing the maximum torque by making use of the calculated values, and conventionally, it was understood that the larger the residual magnetic flux density Br and the thicker the lamination thickness L are, the larger the output torque is.

By making use of the above relationships, an HB type stepping motor can be designed substantially optimally with a simplified calculation, and pole number increase and size reduction of the motor can be realized.

According to the present invention, when designing an HB type stepping motor of small size, high torque and high resolution, an optimum torque point thereof can be determined with a simplified calculation.

BRIEF DESCRIPTION OF THE DRAWINGS

FIG. 5A is a graph showing calculation results by finite element method of relationship between magnet residual magnetic flux density and interlinking magnetic fluxes with coil when Tw/τ=0.4 for explaining the present invention;

FIG. 5B is a graph showing calculation results by finite element method of relationship between magnet residual magnetic flux density and interlinking magnetic fluxes with coil when number of teeth is 130 for explaining the present invention;

FIG. 5C is a graph showing calculation results by finite element method of relationship between motor axial direction lamination thickness and interlinking magnetic fluxes with coil when number of teeth is 130 for explaining the present invention;

FIG. 5D is a graph showing calculation results by finite element method of relationship between teeth width ratio and interlinking magnetic fluxes with coil when number of teeth is 130 for explaining the present invention;

FIG. 6 is a graph showing optimum relationships between magnet residual magnetic flux density Br, gap diameter D, lamination thickness L and magnet effective surface area A according to the present invention;

DETAILED DESCRIPTION OF THE EMBODIMENTS

Embodiments of the present invention will be explained with reference to FIG. 1 through FIG. 7B.

Figure 1:
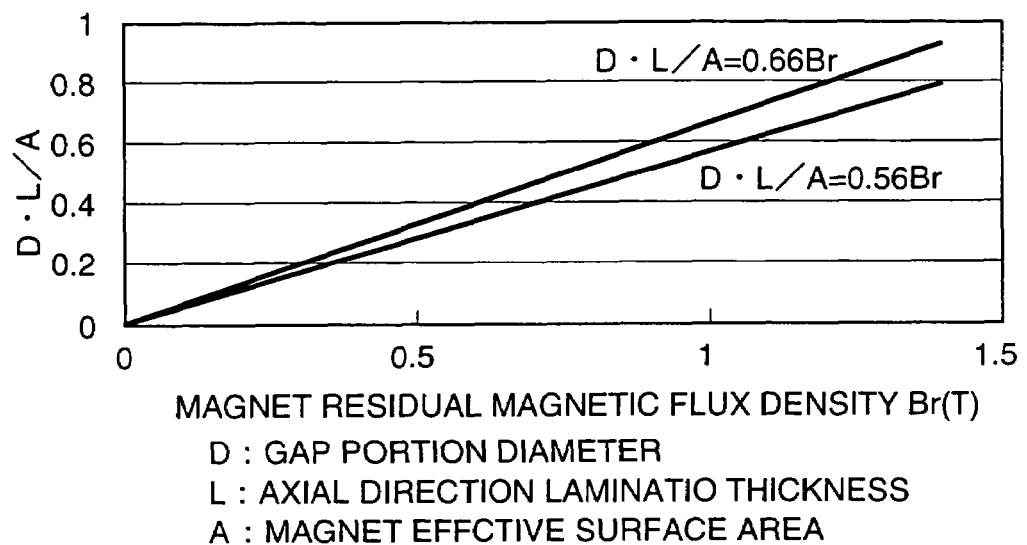
FIG. 1 is a graph showing relationships between magnet residual magnetic flux density Br, gap diameter D, lamination thickness L and magnet effective surface area A for explaining the present invention.

FIG. 1 shows basic relationships between coefficients for determining gap diameter D and lamination thickness L according to magnet residual magnetic flux density Br of an outer rotor type stepping motor representing one embodiment according to the present invention.

In an outer rotor type stepping motor, when the coefficient k is in a range of 0.56-0.66(1/T), the torque output can be most efficiently generated, therefore, if the lamination thickness L is determined so as to satisfy the above coefficient range under limitations of the number of teeth (number of poles) and the outer diameter, a motor having a desirable efficiency can be obtained.

Now, the details will be explained with reference to the drawings. An HB type stepping motor is a kind of synchronous motor and of which rotor is designed to rotate by a predetermined angle every time when drive coils to be current conducted and current flowing direction are switched. Although a synchronous motor is usually driven by an AC power source, a stepping motor is driven by a DC power source while switching connections of the drive coils with respect to the DC power source. Since the switching timing is commanded by pulse signals from a control circuit, the stepping motor can be called as a pulse motor. Important features of such stepping motor is that the rotating direction, motor rotation angle and rotation speed can be at the same time controlled respectively by the switching order, by the accumulated number of switching and by the switching speed.

Since a rotor of an HB type stepping motor is structured through a mechanical processing to have many number of small teeth poles, a stepping motor can generate a large torque in comparison with the volume thereof and perform a stepping operation by a small unit angle, the HB type stepping motors are broadly used in industries and office automation use.

Figure 2A:
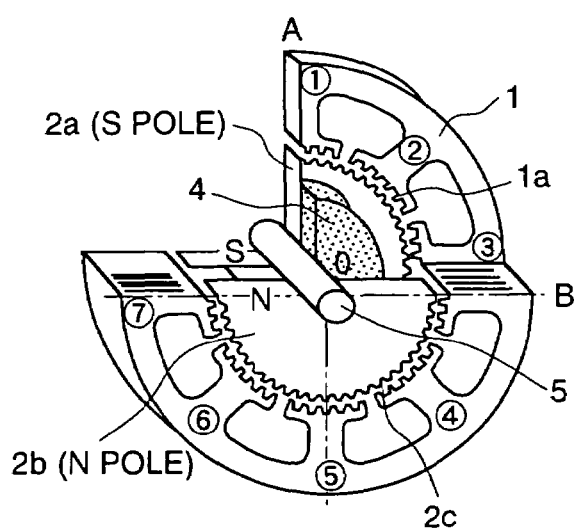
FIG. 2A is a partially cut perspective view of a conventional inner rotor HB type stepping motor.
Figure 2B:
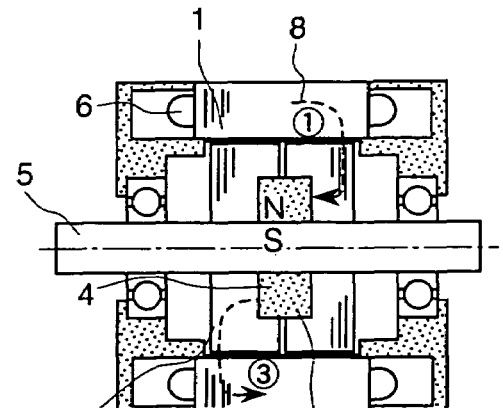
FIG. 2B is a cross sectional view taken along A-O-B in FIG. 2A.

FIGS. 2A and 2B show a structure of a most common inner rotor type two phase stepping motor having a basic step angle 1.8 for facilitating understanding of the present invention. Both rotor and stator of the HB type stepping motor are constituted by laminated steel plates and a gap between the stator 1 and the rotor 2 is reduced to the extent with no manufacturing problems (generally, in a range of 30-50 μm).

With regard to the configuration of the stator 1, the stator 1 is provided with eight poles disposed with an equal pitch of 45, and each of the stator poles is provided with six small teeth 1a with a pitch of 7.2, which are distributed both sides with reference to the center thereof. On the other hand, the rotor 2 is constituted by rotor cores 2a and 2b, each having fifty small teeth poles 2c around the circumference thereof and a magnet 4 magnetized in the axial direction and sandwiched by the rotor cores 2a and 2b. Further, the small teeth poles 2c on the upper and lower rotor cores 2a and 2b are positioned in a manner that their electrical angle are offset each other by 180. The magnet 4 is constituted by such as rare earth metal magnet including samarium cobalt or neodymium ferrite boron, alnico magnet and ferrite magnet. Further, a shaft 5 is constituted by a non-magnetic body.

Although an illustration of a winding is omitted, with respect to first and third poles and fifth and seventh poles an A phase coil is wound in a manner that the winding direction for the third and seventh poles is opposite to that for the first and fifth poles, and a B phase coil is wound in the same manner as above on second, fourth, sixth and eighth poles. The poles are indicated by the corresponding encircled numerals.

In FIGS. 2A and 2B structure, when the small teeth poles 2c on the N pole side rotor core 2a are in a state to face the small teeth poles 1a on the third and seventh poles at the stator side in one to one relationship, the small teeth poles 2c on the S poles side rotor core 2a are in a state to face the small teeth poles 1a on the first and fifth poles in one to one relationship. Further, in this instance, the small teeth poles 1a on the second and sixth poles are in a state to be offset by ½ pitch in anti-clock wise direction with respect to the small teeth poles on the N pole side rotor core 2b and to be offset by ½ pitch in clock wise direction with respect to the small teeth poles 2c on the S pole side rotor core 2a. The small teeth poles 1a on the fourth and eighth poles are in a state to be offset by ½ pitch in clock wise direction with respect to the small teeth poles 2c on the N pole side rotor core 2b and to be offset by ½ pitch in anti-clock direction with respect to the small teeth poles 2c on the S pole side rotor core 2a.

Accordingly, as indicated by magnetic paths 8 in FIG. 2B, magnetic fluxes flowing out from the N pole side of the magnet 4 pass through the third and seventh poles, enter into the first and fifth poles through an outer circumferential yoke portion while being twisted in axial direction and reach the S pole side rotor core 2a. Further, with regard to the second, fourth, sixth and eighth poles, the fluxes flowing out from the N pole side rotor core 2b flow in the axial direction and enter into the S pole side rotor core 2a.

Due to the above explained complex magnetic flux flows, magnetic flux density distributions having a variety of magnitudes and directions are induced at the small teeth poles 1a on the respective poles. Torques proportional to the magnetic flux densities act on the respective small teeth poles and the rotor stops rotation at a balancing position where the totaled torques become zero.

Although two phases winding is common for the stator, it is known when the number of phases is increased, a desirable characteristic can be obtained. However, when increasing the number of phases the structure of the stator 1 and the drive circuit thereof generally complexes, for this reason five phases are considered to be a practical limit for the stator.

Further, when assuming the number of phases is m and the number of small teeth poles of the rotor is Nr, a base step angle $\theta s$ of an HB type stepping motor can be expressed by the following equation;

$$\theta s = \pi/(m \times Nr) \quad (3)$$

Figure 3:
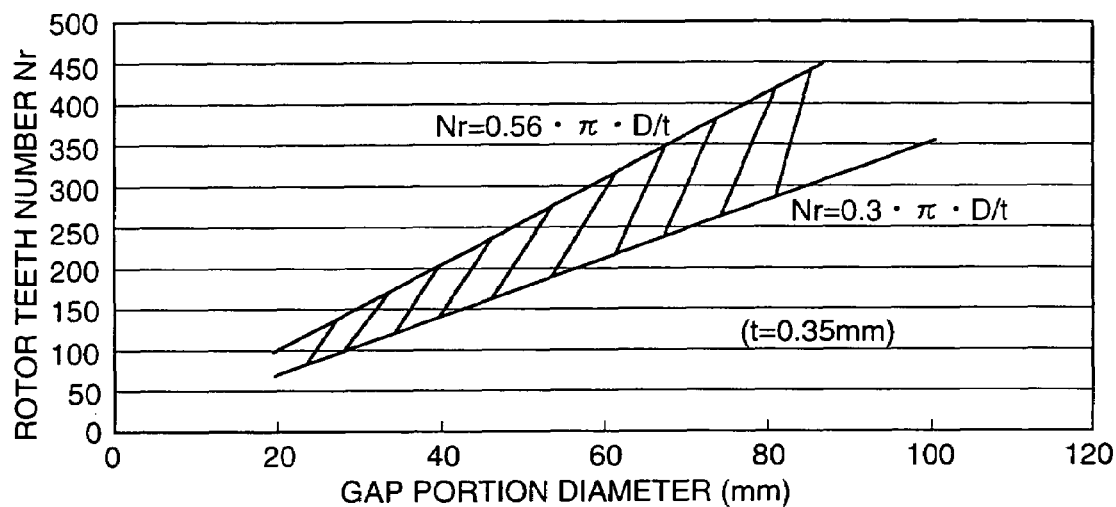
FIG. 3 is a graph showing a relationship between gap portion diameter and rotor teeth number, when the thickness of an electro magnetic steel plate t is 0.35 mm for explaining the present invention.

From the above equation (3), it will be understand that when the number of small teeth poles for the rotor increases, the base step angle $\theta s$ decreases and the resolution of the motor increases. However, the number of the small teeth poles of a common stepping motor is primarily 50 because of the processing limit thereof. With regard to the processing limitation, since magnetic members such as electromagnetic steel plates are processed by a press work, it is understood these days that the limitation of the smallest processable width is about 80% of the plate thickness. Since the thickness of the plate is primarily 0.5 mm, the processable limit width is 0.4 mm. When thinner electromagnetic steel plates are used, since the plate thickness thereof is 0.35 mm, the processable limit width is 0.28 mm. When the processable limit width is determined, a number of teeth depending on a gap diameter can be determined. FIG. 3 shows a relationship between gap diameter and number of teeth when electromagnetic steel plates of 0.35 are used.

Figure 4A:
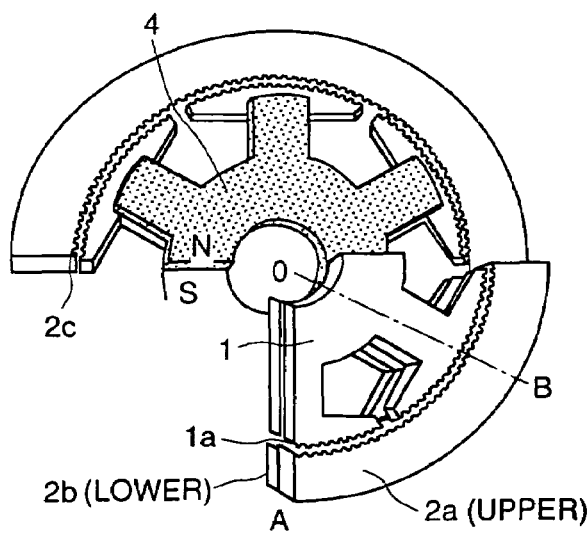
FIG. 4A is a partially cut perspective view of an outer rotor HB type stepping motor according to the present invention.
Figure 4B:
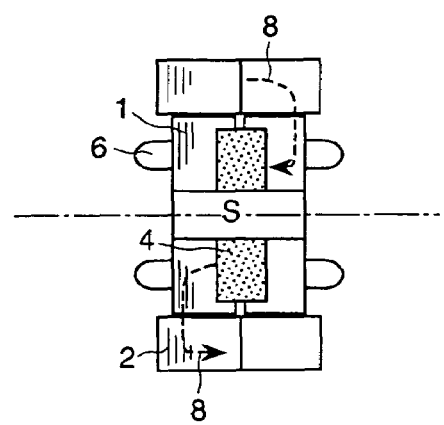
FIG. 4B is a cross sectional view taken along A-O-B in FIG. 4A.

In the present invention, in order to increase an output power ratio with respect to the motor physical scale and to achieve a high resolution, an outer rotor type is employed, and a structure, which increases the number of teeth to a limit, is used. FIGS. 4A and 4B show an embodiment of an outer rotor HB type stepping motor according to the present invention.

The fundamental principle of the outer rotor HB type stepping motor as shown in FIGS. 4A and 4B, in which the rotor side is disposed outside the gap portion diameter, is same as that of the inner rotor HB type stepping motor as shown in FIGS. 2A and 2B. In FIGS. 4A and 4B embodiment, although the magnet is sandwiched at the stator side, the magnet can be sandwiched by the rotor side cores in the same manner as in the inner rotor type stepping motor as shown in FIGS. 2A and 2B.

In the structure of FIGS. 4A and 4B, it is sufficient if the thickness of the core back portion of the rotor side is a few times of the depth of the small teeth, although which varies depending on the cross sectional area of the magnet 4 and the residual magnetic flux density Br of the magnet 4, the thickness of the core back portion can be reduced up to 5-10 mm.

Accordingly, a motor having an outer diameter determined by adding 10-20 mm to the gap portion diameter is realized. The output power of the motor can be maximized, when the coefficient k, which determines the gap diameter D and the lamination thickness L in connection with magnet residual magnetic flux density Br as shown in FIG. 1, is in a range of 0.56-0.66 (1/T), in which range the torque output can be generated most efficiently. Namely, an HB type stepping motor which can generate the maximum torque with the smallest physical scale is an outer rotor HB type motor having parameters within the hatched area as shown in FIG. 3.

FIGS. 5A through 5D show calculation results of parameters for an outer rotor type HB stepping motor according to the present invention by making use of finite element method (FEM).

The diameter of the outer rotor type stepping motor used for the calculation in FIGS. 5A through 5D is about 50 mm. FIG. 5A shows calculation results representing relationship between residual magnetic flux density Br of the magnet 4 and interlinking magnetic flux $\psi$ with coil, when the teeth width ratio Tw/$\tau$ is 0.4 and while fixing the lamination thickness L in the axial direction comparatively short. FIGS. 5B through 5D show calculation results, when the number of teeth is set comparatively large at 130. Since the output torque is proportional to Nr×$\psi$, as the calculation results, the magnitudes of the interlinking magnetic fluxes $\psi$ with coil are compared.

Since the cost of a magnet increases depending on an increase of the residual magnetic flux density Br, if a magnet having a small residual magnetic flux density Br can be used, the manufacturing cost of a motor can be reduced. From FIG. 5B, it will be understood that until the magnet residual magnetic flux density Br of 0.45 (T), the interlinking magnetic fluxes with coil increases depending on the increase of the magnetic flux density and the output of the motor increases, in particular, when the magnet residual magnetic flux density Br exceeds 0.3 (T), the interlinking magnetic fluxes extremely increases. Further, since when the residual magnetic flux density Br exceeds 0.45 (T), the interlinking magnetic fluxes with coil decreases, it will be understood that a use of a magnet having a higher residual magnetic flux density than 0.45 (T) is unnecessary. Therefore, if a magnet having a residual magnetic flux density in a range of 0.3 (T)-0.45 (T) is selected, an inexpensive but high output outer rotor type hybrid stepping motor can be obtained.

According to a conventional rule of thumb, although it is believed that the motor output is enhanced depending on the magnitude of the residual magnetic flux density Br of a magnet 4, however, it is understood that an optimum value exists in connection with the lamination thickness L. FIG. 5B shows comparison results when the teeth width ratios Tw/$\tau$ are respectively 0.4 and 0.3, while fixing the teeth number at 130 and with the same lamination thickness. From FIG. 5A, it will be understood that even if the teeth width ratio varies, there exists an optimum value combination between the residual magnetic flux density Br of the magnet 4 and the lamination thickness L.

FIG. 5C shows calculation results representing effects of the lamination thickness L on the interlinking magnetic fluxes $\psi$ when setting the residual magnetic flux density Br of the magnet 4 high at the teeth number of 130. From FIG. 5C, it will be understood that in a certain range the output of the motor increases depending on the increase of the lamination thickness L, however, after exceeding the range the output increase is saturated and the output cannot be increased by a simple increase of the lamination thickness L. From this calculation results it will be also understood that there exists an optimum lamination thickness L. FIG. 5D shows a variation of interlinking magnetic fluxes ψ depending on the teeth width ratio Tw/τ. From FIG. 5D, in which only the teeth width ratio Tw/τ is varied while fixing the parameters such as the gap size and the number of teeth, in an applicable range of the teeth width ratio, the maximum output can be achieved at the teeth width ratio Tw/τ of 0.3.

From the above calculation results, a method of determining an optimum point when designing an HB type stepping motor can be estimated. However, it is practically difficult to survey parameters by making use of FEM every time when performing designing calculation, therefore, a simplified optimum point estimation method is desirable.

When assuming an axial direction surface area of a magnet is A, the gap portion diameter is D and the lamination thickness is L, a gap average magnetic flux density Bg can be expressed by the following equation;

$$Bg = Br \times A / (\pi \times D \times L \times Tw/\tau) \quad (4)$$

When modifying equation (4), the following equation is obtained;

$$D \times L / A = k \times Br \quad (5)$$

The coefficient k in equation (5) can be expressed as follows;

$$K = 1/(\pi \times Bg \times Tw/\tau) \quad (6)$$

The average magnetic flux density Bg for respective optimum values does not depend on such as the lamination thickness L, the outer diameter D and the residual magnetic flux density Br of the magnet 4, but is determined in a certain range in relation to the teeth width ratio Tw/τ. The relationship is that when the teeth width ratio Tw/τ decreases, the gap average magnetic flux density Bg decreases.

FIG. 6 shows plotted results in a graph form of equation (5) representing a relationship between residual magnetic flux density Br of the magnet 4 and the lamination thickness L when the analysis results with FEM show optimum values (the optimum values are judged in an output region up to 90%). The plotted results revealed that all of the results come into a certain range. The optimum gap average magnetic flux densities Bg in this instance are 1.6-1.8 (T) when the teeth width ratio Tw/τ=0.3, 1.4-1.5 (T) when Tw/τ=0.35, 1.2-1.4 (T) when Tw/τ=0.4, and 1.0-1.2 (T) when Tw/τ=0.45. Accordingly, an optimum design of an HB type stepping motor can be realized when the parameters thereof are determined while keeping the coefficient k in equation (5) in a range of 0.56-0.66(1/T).

Figure 7A:
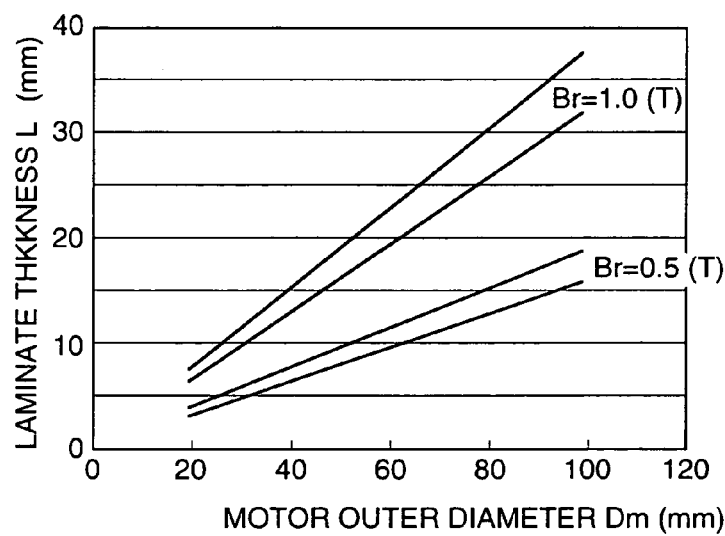
FIG. 7A is a graph showing relationship between motor outer diameter Dm and lamination thickness L of an outer rotor type stepping motor according to the present invention.
Figure 7B:
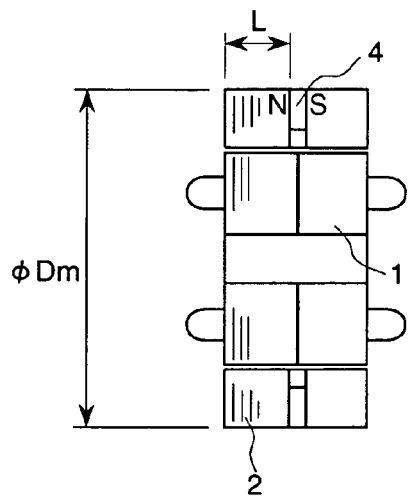
FIG. 7B is a cross sectional view of the outer rotor type stepping motor as in FIG. 7A for explaining the motor diameter Dm and the lamination thickness L.

FIG. 7 shows a relationship between motor outer diameter Dm and lamination thickness L. In that lamination thickness L of the motor calculated according to equation (5) is illustrated when the residual magnetic flux densities Br of the magnet 4 are respectively 0.5 and 1.0 in case when the inner diameter of the magnet 4 is about 70% of the motor outer diameter.

The invention claimed is:

1. An outer rotor type hybrid stepping motor comprising:
   a stator;
   a rotor;
   a magnet disposed axially in one of the stator and the rotor; and
   a stator core disposed inward of from a gap formed between the stator and the rotor; wherein
   a stator winding wound around the stator core and the rotor is disposed outside the gap; and
   assuming A is a cross sectional area in the axial direction of the magnet, D is a gap diameter, L is an aggregate lamination thickness of the stator core in the axial direction, Br is a residual magnetic flux density of the magnet, and K is a coefficient expressed in units of (1/T) (T representing Tesla), the lamination thickness L and the residual magnetic flux density Br are selected such that in the following equation, $$D \times L / A = k \times Br,$$

the coefficient k is maintained within a range of 0.56-0.66(1/T).

2. An outer rotor type hybrid stepping motor according to claim 1, wherein, assuming further that t is a plate thickness of individual electromagnetic steel plates used for the core, and Nr is a number of small teeth poles on the rotor, the following equation is satisfied, such that a coefficient α is kept in a range of 0.3-0.56;

$$Nr = \alpha \times \pi \times D / t.$$

* * * * *